(12) United States Patent  
Nishiyama

(10) Patent No.: US 8,833,847 B2
(45) Date of Patent: Sep. 16, 2014

(54) VEHICLE SEAT

(75) Inventor: Kunio Nishiyama, Okazaki (JP)

(73) Assignee: Toyota Boshoku Kabushiki Kaisha, Aichi-Ken (JP)

(*) Notice: Subject to any disclaimer, the term of this patent is extended or adjusted under 35 U.S.C. 154(b) by 43 days.

(21) Appl. No.: 13/414,156

(22) Filed: Mar. 7, 2012

(65) Prior Publication Data

US 2012/0228908 A1 Sep. 13, 2012

(30) Foreign Application Priority Data

Mar. 10, 2011 (JP) ................................ 2011-052724

(51) Int. Cl.
B60N 2/36 (2006.01)
B60N 2/60 (2006.01)
B60N 2/58 (2006.01)

(52) U.S. Cl.
CPC ................ B60N 2/36 (2013.01); B60N 2/6009 (2013.01); B60N 2/5825 (2013.01)
USPC ........... 297/119; 297/112; 297/146; 297/167; 297/378.1; 297/378.12; 297/378.14

(58) Field of Classification Search
USPC ................. 297/146, 163, 167, 378.1, 378.11, 297/378.12, 378.13, 378.14, 382, 112, 118, 297/119
See application file for complete search history.

(56) References Cited

U.S. PATENT DOCUMENTS

| 2,240,748 | A | * | 5/1941 | Bak ................................ 297/146 |
| 4,005,902 | A | * | 2/1977 | Balin ............................ 297/129 |
| 5,286,084 | A | * | 2/1994 | Bart ....................... 297/378.1 X |
| 5,303,976 | A | * | 4/1994 | Nobile et al. ................. 297/146 |
| 5,531,506 | A | * | 7/1996 | Scott .......................... 297/146 X |
| 5,658,046 | A | * | 8/1997 | Rus ............................ 297/378.1 |
| 5,788,324 | A | * | 8/1998 | Shea et al. ............. 297/378.1 X |
| 5,871,255 | A | * | 2/1999 | Harland et al. ...... 297/378.13 X |
| 6,059,358 | A | * | 5/2000 | Demick et al. ............ 297/146 X |
| 6,648,395 | B2 | * | 11/2003 | Hoshino .............. 297/378.12 X |
| 6,672,662 | B1 | * | 1/2004 | Balk ....................... 297/378.1 X |
| 6,860,550 | B2 | * | 3/2005 | Wojcik .......................... 297/163 |
| 7,036,884 | B2 | * | 5/2006 | Becker et al. .............. 297/378.1 |
| 7,044,550 | B2 | * | 5/2006 | Kim ........................... 297/119 X |
| 7,100,990 | B2 | * | 9/2006 | Kimura et al. ......... 297/378.1 X |
| 7,506,931 | B2 | * | 3/2009 | Christopher et al. ...... 297/378.1 |
| 7,607,726 | B2 | * | 10/2009 | Orlo et al. ................. 297/146 X |
| 8,167,366 | B2 | * | 5/2012 | Charpentier et al. ..... 297/167 X |
| 8,313,147 | B2 | * | 11/2012 | Scheurer .................. 297/378.13 |
| 2005/0236882 | A1 | | 10/2005 | Kim |
| 2011/0260518 | A1 | * | 10/2011 | Scheurer, II ............. 297/378.12 |
| 2013/0001988 | A1 | * | 1/2013 | Lucas ........................... 297/167 |

FOREIGN PATENT DOCUMENTS

JP 2005-306357 11/2005

* cited by examiner

Primary Examiner — Rodney B White
(74) Attorney, Agent, or Firm — Greenblum & Bernstein, P.L.C.

(57) ABSTRACT

A vehicle seat including: a seat back in which a seat body is supported by a seat frame; a backboard provided on a rear surface of the seat back; and a cloth member covering a surface of the backboard, wherein the backboard is attached to the seat frame to have a convex shape in which a center part of a surface thereof protrudes.

5 Claims, 7 Drawing Sheets

_US 8,833,847 B2_

VEHICLE SEAT

CROSS-REFERENCE TO RELATED APPLICATIONS

This application claims priority from Japanese Patent Application No. 2011-052724 filed on Mar. 10, 2011, the entire contents of which are incorporated herein by reference.

TECHNICAL FIELD

Aspects of the present invention relate to a vehicle seat with a backboard serving as a loading platform provided on a back side of a seat back.

BACKGROUND

As described in JP-A-2005-306357, a configuration in which a backboard is provided on a back side of a seat back (backrest) of a vehicle seat is known. According to the vehicle seat, the seat back is tilted to the front side to be closely attached to a seat cushion (sitting part), thereby using a backboard as a loading platform. A cloth member (carpet) is provided to cover a surface (a surface on which a baggage is put) of the backboard in most of these kinds of vehicle seats.

SUMMARY

As described above, since the backboard is a member serving as a loading platform, strength (rigidity) is required to support the baggage. However, as in the vehicle seat disclosed in JP-A-2005-306357, the backboard is generally a plate type (horizontal when the backboard is used as a loading platform), and when a thickness of the backboard is not sufficient, the strength required as a loading platform cannot be secured. Regarding this, some countermeasures are performed, in which a rib is formed on a rear surface of the backboard made of a resin, or a reinforcement material is placed on a rear surface of a backboard made of wood. However, none of the countermeasures are regarded as preferable because manufacturing cost and weight of the backboard increase.

Further, when a cloth member is provided on the surface of the plate-type backboard, there is a problem that the cloth member is wrinkled due to, for example, a manufacturing error (tautness of the cloth member is deteriorated).

Aspects of the present invention has been made in an effort to provide a vehicle seat of a simple configuration, which has a backboard as a loading platform having sufficient strength and can prevent a cloth member provided on the surface from being wrinkled (the cloth member can be made taut).

According to an aspect of the invention, there is provided a vehicle seat including: a seat back in which a seat body is supported by a seat frame; a backboard provided on a rear surface of the seat back; and a cloth member covering a surface of the backboard, wherein the backboard is attached to the seat frame to have a convex shape in which a center part of a surface thereof protrudes.

According to another aspect of the invention, there is provided a vehicle seat including: a seat back including, a seat frame, and a seat body which is supported by the seat frame; and a backboard provided on a rear surface of the seat back, wherein the backboard is attached to the seat frame to have a convex state in which a center part of a surface thereof protrudes.

According to aspects of the invention, the strength (rigidity) of the backboard can be improved without changing a material or thickness of the backboard. Since a cloth member placed to cover the surface of the backboard is tensioned as much as the backboard protrudes, the cloth member can be prevented from being wrinkled (the cloth member can be made taut).

BRIEF DESCRIPTION OF DRAWINGS

FIG. 1 is a side view of a vehicle seat according to an exemplary embodiment of the present invention.

DETAILED DESCRIPTION

Figure 1A:
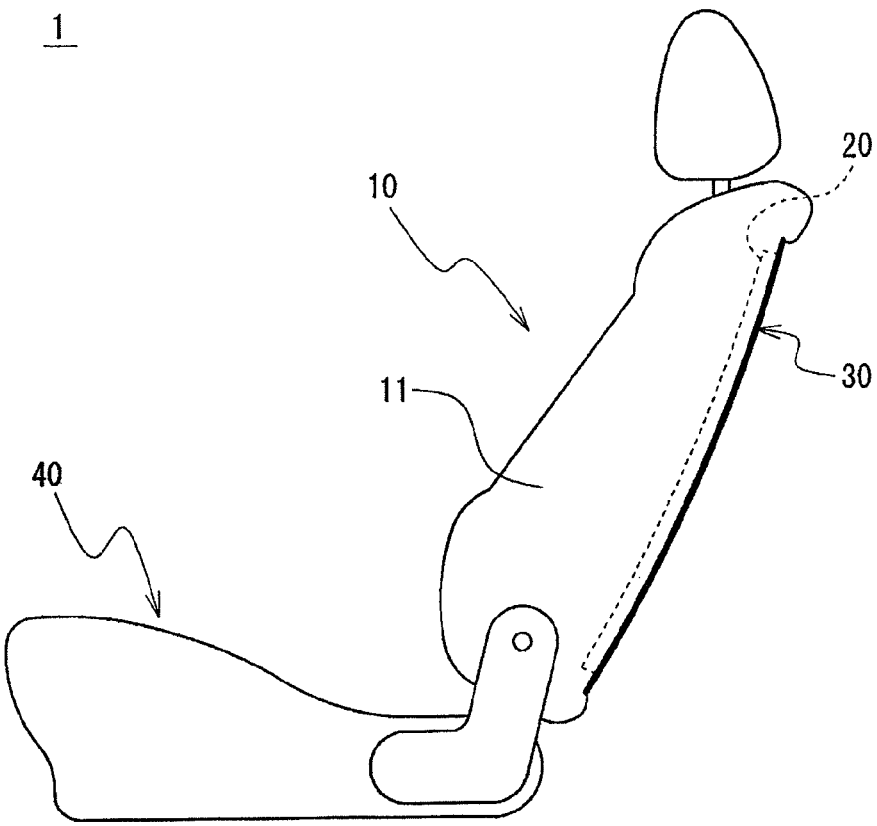
FIG. 1A illustrates a state in which a seat back stands up.
Figure 1B:
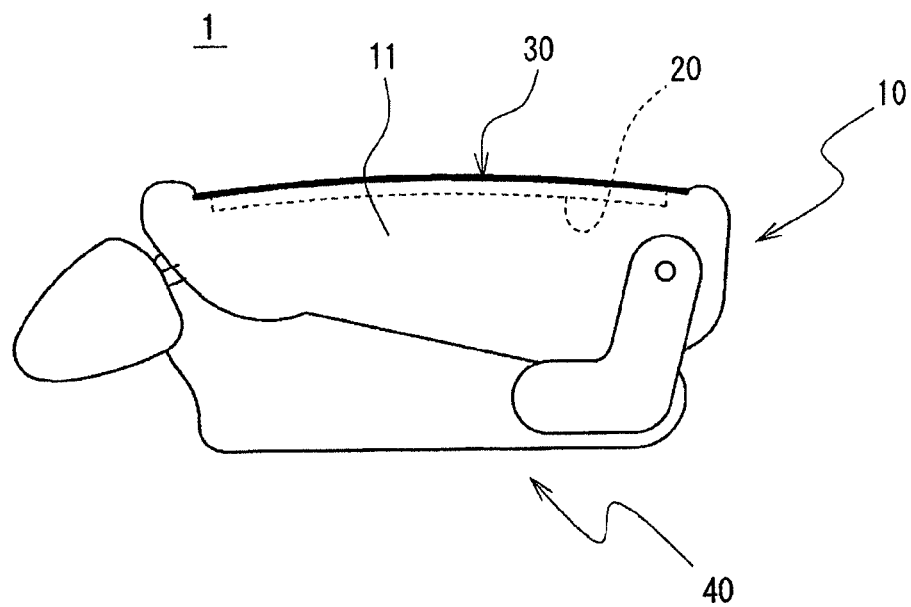
FIG. 1B illustrates a state in which the seat back is closely attached to a seat cushion (tilted to the front side)

Hereinafter, a vehicle seat according to an exemplary embodiment of the present invention will be described in detail with reference to the accompanying drawings. In the following description, a vertical direction simply represents an upper-lower direction in FIG. 1A (a vertical direction of the vehicle seat), a front-rear (rear surface) direction simply represents a left-right direction in FIG. 1A (the front-rear (rear surface) direction of the vehicle seat), and a width direction simply represents a direction perpendicular to the vertical direction and the front-rear direction (a width direction of the vehicle seat). The directions are all based on a state in which the seat back stands up (a state shown in FIG. 1A) (even when the seat back is tilted as shown in FIG. 1B, description will be given with respect to the directions based on the state in which the seat back stands up).

The vehicle seat 1 according to the exemplary embodiment of the present invention includes a seat back 10, a backboard 20 provided on a rear surface of the seat back 10, and a cloth member 30 covering a surface of the backboard 20.

The seat back 10 serves as a backrest of a passenger in an upstanding state. The seat back 10 constitutes a seat section together with a seat cushion 40 serving as a sitting part of the passenger shown in the figure. The seat back 10 may be tilted in the front-rear direction with respect to the seat cushion 40 by a known reclining mechanism. The seat back 10 includes a seat body 11 and a seat frame 12 supporting the seat body 11. The seat body 11 is formed by covering a cushion material 111 with a seat cover 112 (skin). The seat frame 12 is a member serving as a frame of the seat back 10 supporting the seat body 11. In the exemplary embodiment, the backboard 20 is attached to the seat frame 12. A detailed configuration of the seat frame 12 will be described hereinafter.

The backboard 20 is provided on a rear surface of the seat back 10 and serves as a loading platform. When the seat back 10 is tilted to the front side to be closely attached to the seat cushion 40 as shown in FIG. 1B, the rear surface of the seat back 10 is substantially horizontal. A user of a vehicle having the vehicle seat 1 can tilt the seat back 10 to the front side to put baggage on the backboard 20 provided on the rear surface of the seat back 10 while using a widened vehicle space.

In the exemplary embodiment, the backboard 20 is attached to the seat frame 12 to have a convex shape in which a center thereof in the vertical direction of the surface (rear-side surface) protrudes most. A detailed structure is as follows.

Figure 2:
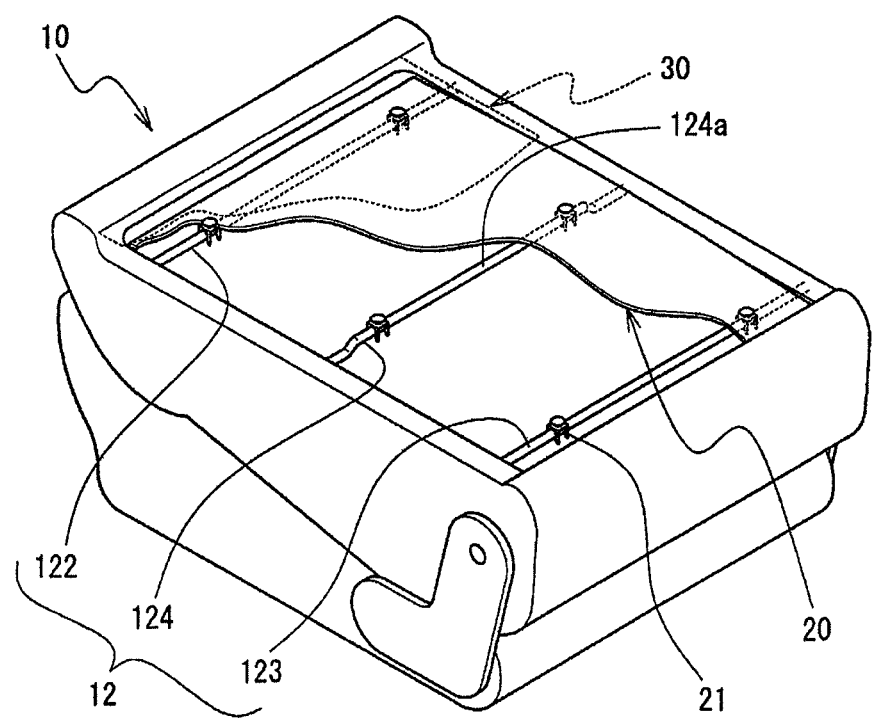
FIG. 2 is an exterior perspective view of a vehicle seat back (a state in which the seat back is closely attached to the seat cushion) according to the exemplary embodiment of the present invention, and a diagram illustrating the backboard and seat cover partially fractured (expressed by dotted lines) in order to illustrate a configuration of a seat frame.
Figure 3:
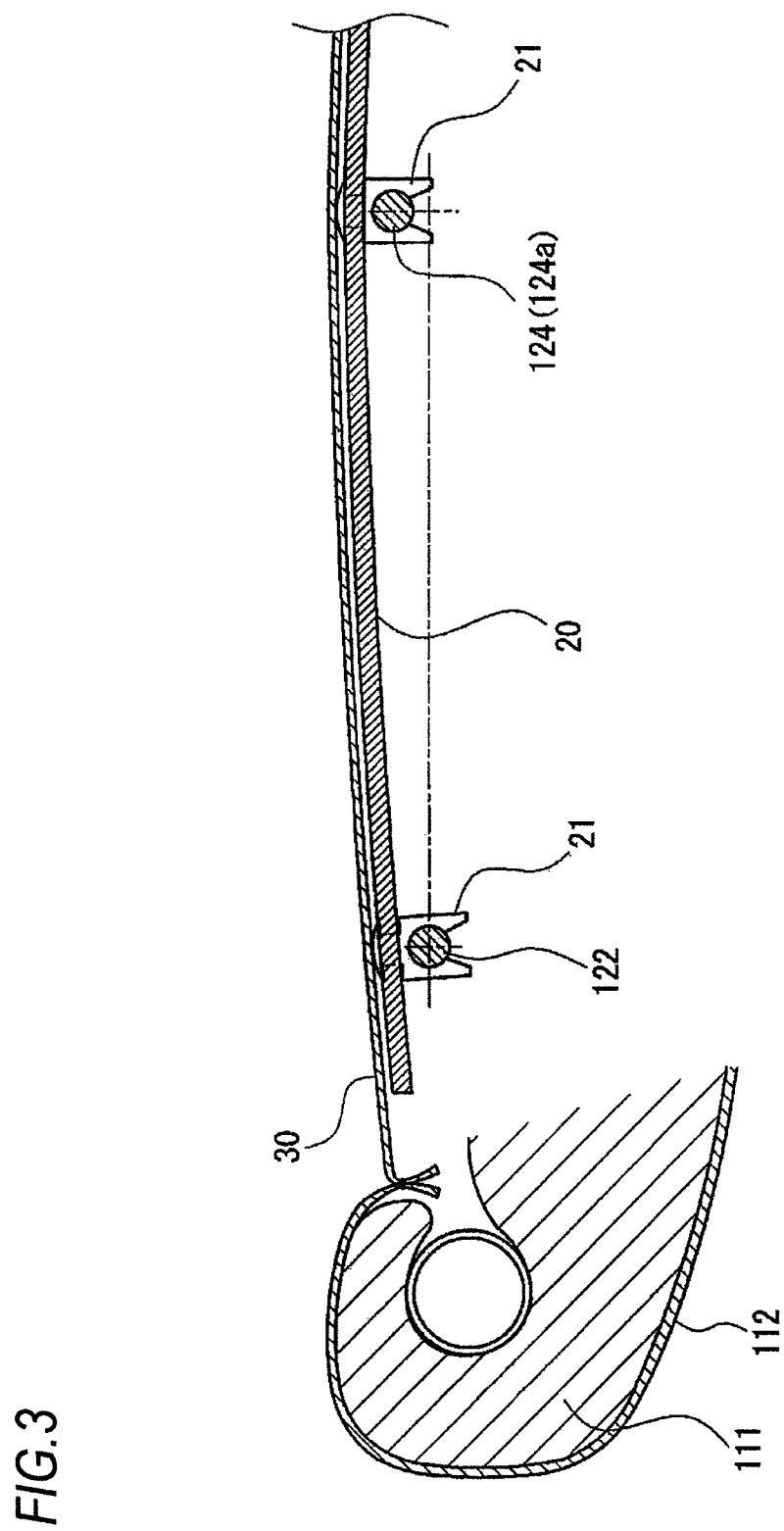
FIG. 3 is a diagram schematically illustrating a cross section obtained by cutting the vehicle seat according to the exemplary embodiment of the present invention along a plane in a vertical direction.

As shown in FIGS. 2 and 3, the seat frame 12 includes three support members of an upper support member 122, a lower support member 123 and a central support member 124 which are attached to a frame body of a frame (not shown). The upper support member 122 is a shaft-shaped member that is positioned at the uppermost side among the support members, and extends straight in a width direction. The lower support member 123 is a shaft-shaped member that is positioned at the lowermost side, and extends straight in the width direction. The upper support member 122 and the lower support member 123 are positioned in parallel with each other and are attached so as to bridge parts of the frame that extend in the vertical direction. Meanwhile, the central support member 124 is attached between the upper support member 122 and the lower support member 123. The central support member 124 is also attached so as to bridge the parts that extend in the vertical direction of the frame. In the exemplary embodiment, a part of the central support member 124 has a shape protruding rearward (having a portion modified to a U-shape). Specifically, the central support member 124 has a portion that protrudes more rearward than a plane defined by the upper support member 122 and the lower support member 123. The portion of the central support member 124 serves as a joining portion 124a with the backboard 20 (hereinafter, simply referred to as a joining portion 124a). The joining portion 124a is positioned in parallel with the upper support member 122 and the lower support member 123. In the exemplary embodiment, each of the support members has the same thickness and a cross section thereof is a circular shape (a round bar or a pipe shape).

The configuration will be described hereinafter in more detail. An axial line of the upper support member 122, an axial line of the lower support member 123, and an axial line of the joining portion 124a of the central support member 124 are parallel to each other. The axial line of the joining portion 124a in the central support member 124 is positioned more rearwards than a plane defined by the axial line of the upper support member 122 and the axial line of the lower support member 123. As described later, a distance between the plane defined by the axial line of the upper support member 122 and the axial line of the lower support member 123 and the axial line of the joining portion 124a of the central support member 124 is proportional to an amount of the protrusion of the backboard 20. That is, as the distance increases, the amount of the protrusion of the backboard 20 increases. The distance is set to, for example, approximately 5 mm.

The backboard 20 is attached to the seat frame 12 having the above-described configuration in the following manner. The backboard 20 is a substantially rectangular plate-type member (plate) when the backboard 20 is not attached to the seat frame 12. So long as the backboard can be bent and transformed, material or thickness of the backboard is not particularly limited. For example, as the backboard, a plate of wood or synthetic resin may be used.

One edge of the plate used for the backboard 20 is joined to the upper support member 122. The other edge facing the one edge is joined to the lower support member 123. A portion that is positioned substantially at the center between the one edge and the other edge is joined to the joining portion 124a of the central support member 124. The joining (fixing) method is not limited. A predetermined portion of the plate may be joined directly to each support member, and joining members 21 shown in FIGS. 2 and 3 may be additionally prepared to join a predetermined portion of the plate and each support member through the joining members 21. In the case where the joining members 21 shown in FIGS. 2 and 3 are used to attach the backboard 20 to the seat frame 2, each of the joining members 21 may have the same shape.

Therefore, when the plate is joined to the seat frame 12, the plate is transformed to a shape in which the center in the vertical direction of the plate protrudes. Specifically, since the axial line of the joining portion 124a of the central support member 124 is positioned in the rearward side of the plane defined by the axial line of the upper support member 122 and the axial line of the lower support member 123, the center of the plate 12 protrudes by the distance between the plane defined by the axial line of the upper support member 122 and the axial line of the lower support member 123 and the axial line of the joining portion 124a of the central support member 124. Accordingly, it is possible to obtain a configuration in which the backboard 20, in which the center thereof in the vertical direction protrudes rearward to have a convex shape (arch-type), is constructed on the rear surface of the seat back 10. For example, when the distance is set to 5 mm, the backboard 20 becomes a convex shape in which a difference in height between a crest line (apex) of the protruding portion of the backboard 20 and a portion of the backboard 20 joined to the upper support member 122 and the lower support member 123 is 5 mm.

The cloth member 30 is a member that covers the surface (rearward surface) of the backboard 20. The cloth member 30 serves as a member that protects the backboard 20 serving as a loading platform, and also serves as a member that improves an aesthetic appearance of the rear surface of the seat back 10. As the cloth member 30, for example, a thick carpet (rug) may be adopted.

In the exemplary embodiment, the cloth member 30 is attached (sewed) to the seat cover 112 covering the cushion material 111. Specifically, the cloth member 30 is sewed to the seat cover 112 at an outer position than each edge of the rectangular backboard 20. Accordingly, the entire surface of the backboard 20 is covered with the cloth member 30. That is, in the exemplary embodiment, the backboard 20 is attached to the seat frame 12 of the seat back 10, and the cloth member 30 is attached to the seat cover 112 of the seat back 10. The backboard 20 and the cloth member 30 are not bonded to each other. The backboard 20 has a convex shape of which the center protrudes, and the cloth member 30 is at least in contact with the convex portion. That is, the cloth member 30 is pressed by the convex-shaped backboard 20, leading to have a convex shape of which a center in the vertical direction protrudes as well. Therefore, the cloth member 30 is tensioned in the vertical direction with the upper edge and the lower edge as support points.

The vehicle seat 1 having the above-described configuration provides the following functional effects. In the vehicle seat 1 according to the exemplary embodiment, the backboard 20 is provided on the rear surface of the seat back 10 to have a convex shape in which the center thereof protrudes. As a result, the seat back 10 is tilted to the front side until the seat back 10 is closely attached to the seat cushion 40, and when the backboard 20 is used as a loading platform, the load of the baggage acts in a direction to maintain the convex-shaped (arch-type) backboard 20 horizontally. That is, the backboard 20 supports the baggage by compression stress generated therein. Therefore, the strength of the backboard 20 as a loading platform is further improved compared with the case in which the backboard 20 is provided in a plate (horizontal) state (a configuration in which the baggage is supported by bending stress), as in the related art. That is, the strength of the backboard 20 as a loading platform can be improved without changing the material or thickness of the board constituting the backboard 20.

Figure 7:
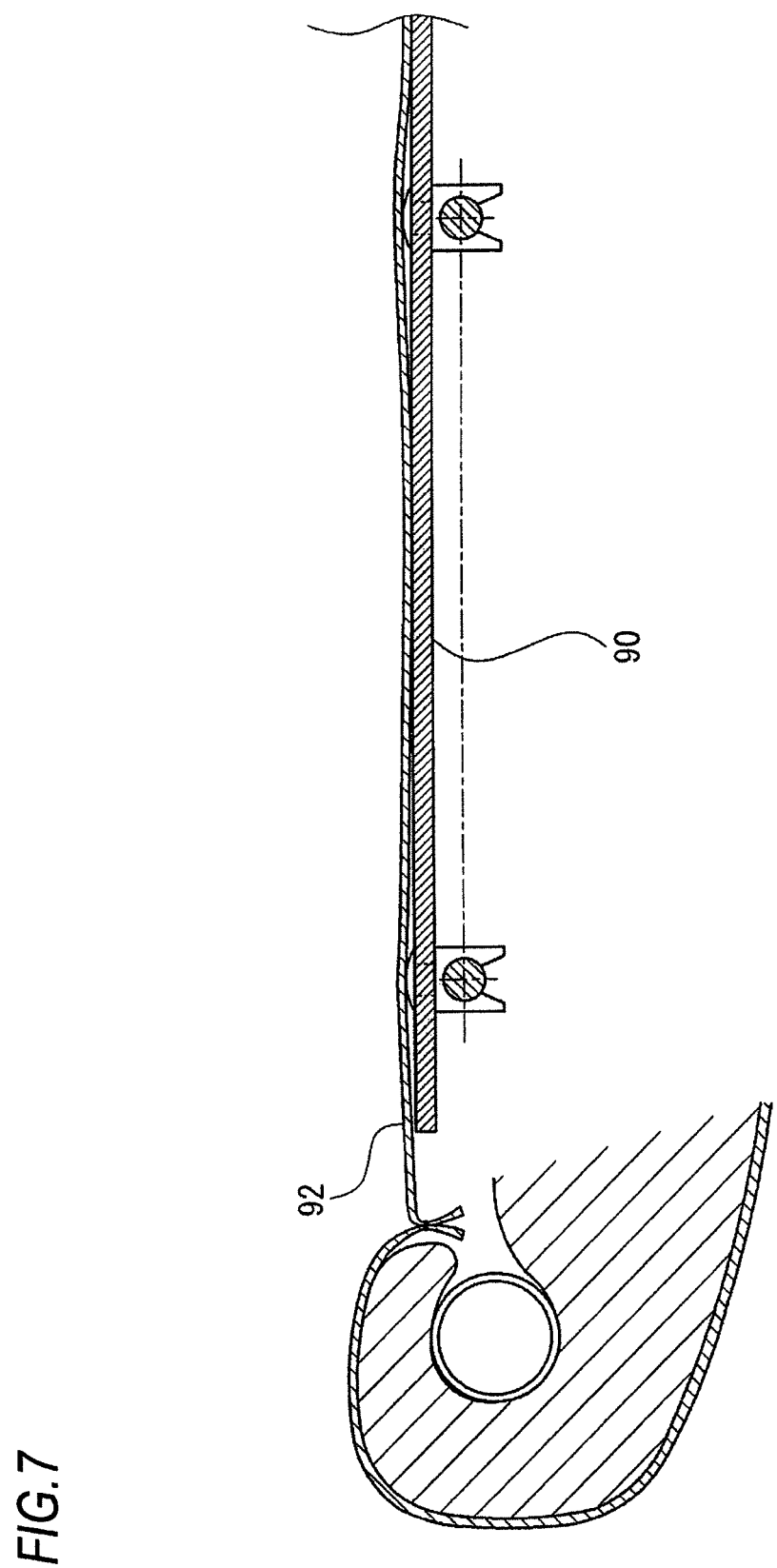
FIG. 7 is a diagram schematically illustrating a cross section obtained by cutting a vehicle seat in the related art along a plane in a vertical direction.

By the convex-shaped backboard 20, the cloth member 30 attached to cover the surface of the backboard 20 is tensioned in the vertical direction. Accordingly, the cloth member 30 can be prevented from being wrinkled (the cloth member 30 can be made taut). That is, the aesthetic appearance of the vehicle seat 1 can be prevented from being deteriorated. For example, in the case of the configuration of the related art in which a backboard 90 is provided in the plate (horizontal) state shown in FIG. 7, when a distance between an attachment position at an upper edge of a cloth member 92 and an attachment position at a lower edge of the cloth member 92 decreases, the cloth member 92 becomes loose, and as a result, the cloth member 92 may be wrinkled. However, in the exemplary embodiment, the cloth member 30 is also tensioned in the vertical direction by the convex-shaped backboard 20 to have a convex shape as well, such that the cloth member 30 can be prevented from being wrinkled.

As described above, the vehicle seat 1 according to the exemplary embodiment is advantageous in that the cloth member 30 can be made taut and the strength as a loading platform is improved by forming the convex-shaped (arch-type) backboard 20.

Here, in a case where the adopted cloth member 30 has an easy-to-stretch direction (a case where the cloth member 30 is stretchy in one direction), the cloth member 30 may be placed to be tensioned in the easy-to-stretch direction. That is, when the backboard 20 is placed to have a convex shape in which the center in the vertical direction protrudes most as in the exemplary embodiment, the easy-to-stretch direction of the cloth member 30 may be placed to coincide with the vertical direction. By this configuration, since the cloth member 30 is tensioned in a stretchable direction, it is difficult for the cloth member 30 to be wrinkled. Furthermore, it is easy to attach the cloth member 30.

Figure 4:
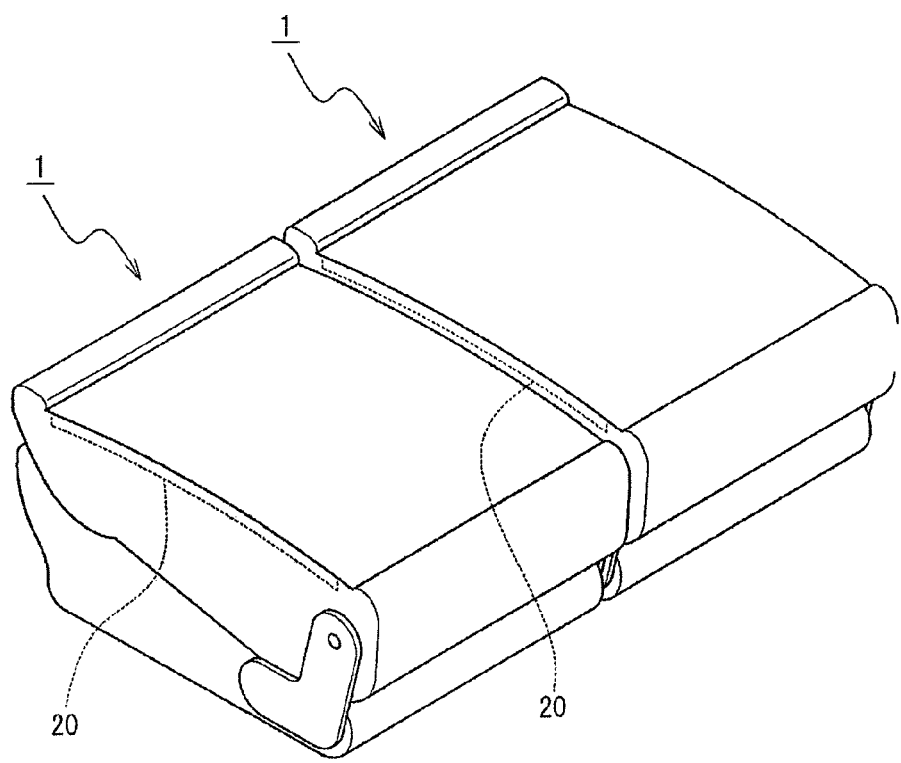
FIG. 4 is an exterior perspective view illustrating a configuration in which vehicle seats according to the exemplary embodiment of the present invention are provided side by side in a width direction.

When the backboard 20 is configured to have a convex shape which protrudes in the vertical direction as described in the present exemplary embodiment, in a case where a plurality of vehicle seats 1 provided with the backboard 20 are provided side by side in the width direction as shown in FIG. 4, the backboards 20 provided in each seat are continuous in the width direction without a step, and as a result, the aesthetic appearance can be prevented from being deteriorated due to the convex-shaped backboard 20. Meanwhile, when, for example, the backboard 20 is configured to have a convex shape which protrudes in the width direction, the effects of "the improvement of the strength as a loading platform" and "the improvement of the tautness of the cloth member 30" as described above can be obtained. However, in this case, since a step (valley) will be generated between the backboards 20 provided in each seat, the aesthetic appearance of the seat may be deteriorated as compared with the configuration in which the backboard 20 has a convex shape which protrudes in the vertical direction.

In the exemplary embodiment, the backboard 20 is attached to the upper support member 122, the lower support member 123 and the central support member 124 of the seat frame 12. Among the members, the joining portion 124a of the central support member 124 with the backboard 20 protrudes more rearward than the plane defined by the upper support member 122 and the lower support member 123. That is, by merely attaching the plate to the seat frame 12, the backboard 20 of which the center protrudes in a convex shape can be constructed on the rear surface of the seat back 10. Since the backboard 20 thus attached is supported at three points by the upper support member 122, the lower support member 123 and the central support member 124, the strength of the backboard 20 as a loading platform is further improved.

Various configurations may be considered as an attachment structure of the backboard 20 to the seat frame. For example, the following configuration (a vehicle seat 1 according to a modified exemplary embodiment) may also be considered.

Figure 5:
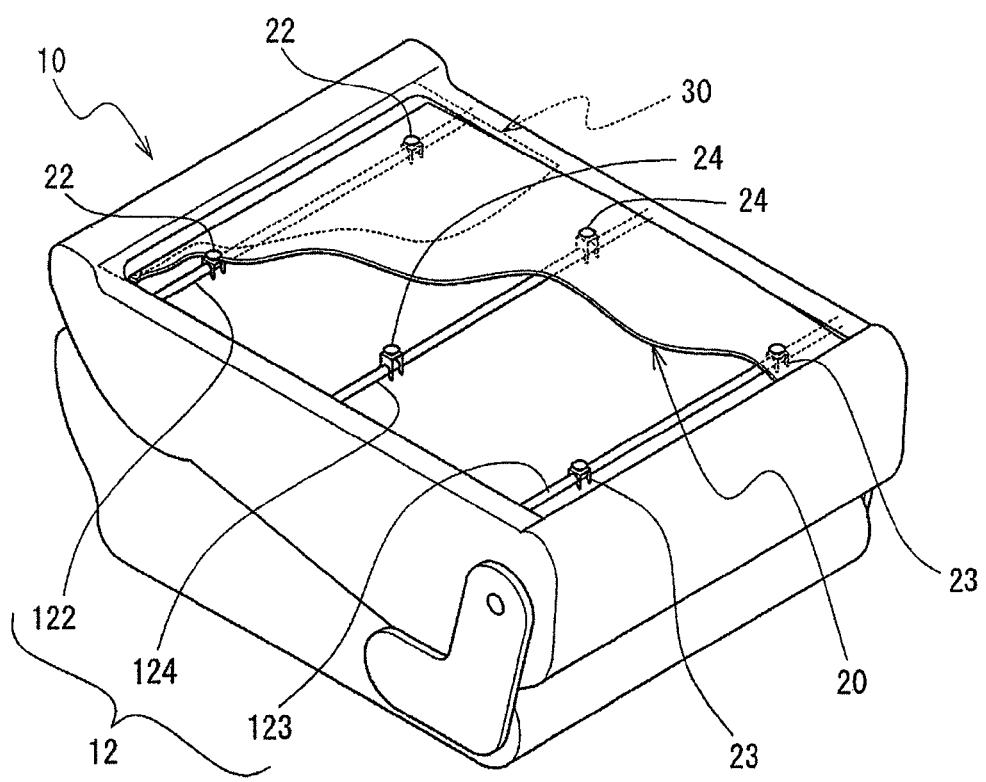
FIG. 5 is an exterior perspective view of a vehicle seat back (a state in which the seat back is closely attached to the seat cushion) according to a modified exemplary embodiment, and a diagram illustrating the backboard and seat cover partially fractured (expressed by dotted lines) in order to illustrate a configuration of a seat frame.
Figure 6:
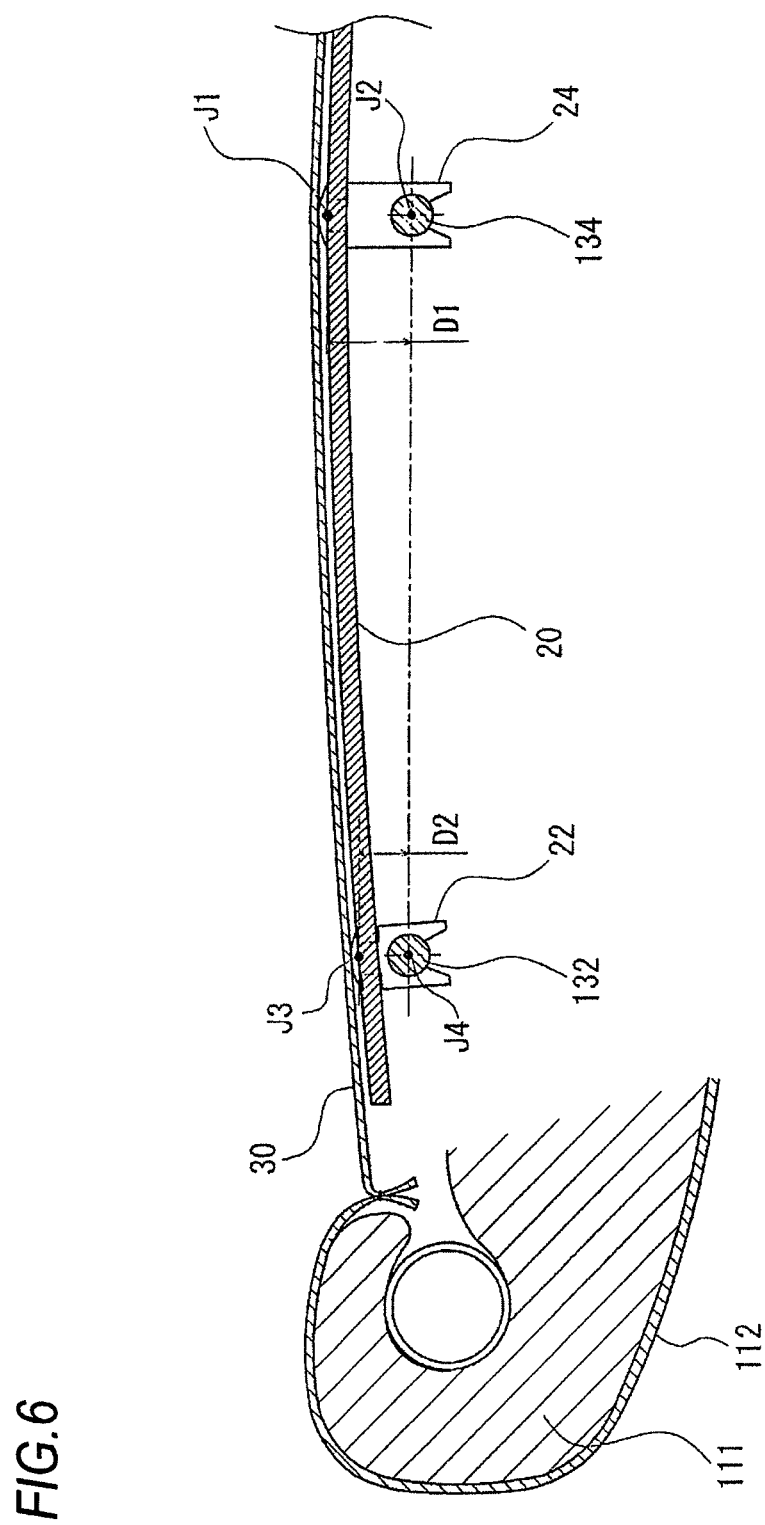
FIG. 6 is a diagram schematically illustrating a cross section obtained by cutting the vehicle seat according to the modified exemplary embodiment along a plane in a vertical direction.

As shown in FIGS. 5 and 6, the vehicle seat 1 according to the modified exemplary embodiment is different from the vehicle seat 1 according to the exemplary embodiment in a configuration of a seat frame 13. Specifically, the vehicle seat 1 according the modified exemplary embodiment is different from the vehicle seat according to the exemplary embodiment in that a central support member 134 of the seat frame 13 extends straight in the same width direction as an upper support member 132 and a lower support member 133. That is, (an axial line of) the upper support member 132, (an axial line of) the lower support member 133 and (an axial line of) the central support member 134 lie in the same plane.

The backboard 20 is attached to the seat frame 13 having the above configuration through joining members. The joining members include upper joining members 22 joining an upper part of the backboard 20 and the upper support member 132 of the seat frame 13, lower joining members 23 joining an lower part of the backboard 20 and the lower support member 133 of the seat frame 13, and central joining members 24 joining a center in the vertical direction of the backboard 20 and the central support member 134 of the seat frame 13. Among the members, the upper joining members 22 and the lower joining members 23 have the completely same configuration. Meanwhile, the central joining members 24 are larger than the upper joining members 22 and the lower joining members 23.

Specifically, there is a difference in configuration as follows. Each of the upper joining members 22 and the lower joining members 23 have a backboard joint joined to the backboard 20 and a support member joint joined to the support member. The configurations of both of the joints are not particularly limited. For example, the backboard joint may adopt a configuration in which the backboard 20 is inserted and held into the backboard joint in a thickness direction thereof. The support member joint may adopt a configuration in which the support member is inserted and held between claw pieces of a biforked type.

Similarly, the central joining member 24 also has a backboard joint and a support member joint. In the modified exemplary embodiment, as seen from FIG. 6, a distance D1 between a joining portion J1 (backboard joint) of the central joining member 24 with the backboard 20 and a joining portion J2 (support member joint) of the central joining member 24 with the central support member 134 is set to be larger than a distance D2 between a joining portion J3 (backboard joint) of the upper joining member 22 and the lower joining member 23 with the backboard 20 and a joining portion J4 (support member joint) of the upper joining member 22 and the lower joining member 23 with the support members. Therefore, when the backboard 20 is attached to the seat frame 13 by using the upper joining member 22, the lower joining member 23, and the central joining member 24, the backboard 20 has a convex type of which the center protrudes by an amount of (D1-D2).

As described above, with respect to each of the support members arranged on the same plane of the seat frame 13, when the above-described distance D1 of the central joining member 24 for joining the center of the backboard 20 is set to be larger than the above-described distance D2 of the upper joining member 22 and the lower joining member 23, the center of the backboard 20 attached to the seat frame 13 through the joining member may protrude in the convex type by an amount of the difference between the distances. That is, by merely attaching the plate-type material to each support member through each joining member, the backboard 20 which protrudes in a convex shape be constructed on the rear surface of the seat back 10. Even in the modified exemplary embodiment, since the backboard 20 is supported at three points by the upper support member 132, the lower support member 133 and the central support member 134 through the respective joining members, the strength of the backboard 20 as the loading platform is further improved.

As described above, although the exemplary embodiment of the present invention has been described in detail, the present invention is not limited to the exemplary embodiment, and various modifications can be made within a scope without departing from the spirit of the present invention.

For example, the exemplary embodiment has been described with respect to the configuration in which the cloth member 30 is attached (sewed) to the seat cover 112, but is not limited thereto. For example, the periphery of the cloth member 30 may be joined and attached to the periphery of the backboard 20. That is, so long as the cloth member 30 is tensioned by the backboard 20 which protrudes in a convex type (that is, the surface of the backboard 20 and the rear surface of the cloth member 30 are not bonded to each other), any attachment method may be adopted.

The present invention provides illustrative, non-limiting aspects as follows:

(1) According to a first aspect, there is provided a vehicle seat including: a seat back in which a seat body is supported by a seat frame; a backboard provided on a rear surface of the seat back; and a cloth member covering a surface of the backboard, wherein the backboard is attached to the seat frame to have a convex shape in which a center part of a surface thereof protrudes.

Accordingly, a backboard serving as a loading platform is provided on the rear surface of a seat back to have a convex shape in which the center thereof protrudes. As a result, since a load (weight of baggage) acting on the backboard is converted into a compression force in the backboard, the strength (rigidity) of the backboard can be improved without changing the material or thickness of the backboard. Since the cloth member placed to cover the surface of the backboard is tensioned as much as the backboard protrudes, the cloth member can be prevented from being wrinkled (the cloth member can be made taut).

(2) According to a second aspect, there is provided the vehicle seat according to the first aspect, wherein the backboard is attached to the seat frame to have a convex state in which the center part of the backboard in a vertical direction protrudes to the most rearward side.

Accordingly, an aesthetic appearance can be prevented from being deteriorated due to the convex shape of the backboard.

(3) According to a third aspect, there is provided a vehicle seat according to the second aspect, wherein the seat frame includes: an upper support member extending in a width direction and is joined with an upper part of the backboard; a lower support member extending in the width direction and is joined with a lower part of the backboard; and a central support member joined with the center part of the backboard in the vertical direction of the backboard, and wherein a joining portion of the central support member with the backboard protrudes more rearward than a plane defined by the upper support member and the lower support member.

Accordingly, when a plate-type material is attached to a seat frame, the center of the plate is pushed up by a central support member protruding more rearward than an upper support member and a lower support member. That is, by merely attaching the plate-type material to the seat frame, the backboard protruding in a convex shape can be constructed on a rear surface of the seat back. Since the backboard is supported at three points by the upper support member, the lower support member and the central support member, the strength as a loading platform is further improved.

(4) According to a fourth aspect, there is provided the vehicle seat according to the second aspect, wherein the seat frame includes: an upper support member extending in a width direction and is joined with an upper part of the backboard through an upper joining member; a lower support member extending in the width direction and is joined with a lower part of the backboard through a lower joining member; and a central support member extending in the width direction and is joined with the center part of the backboard in the vertical direction of the backboard through a central joining member, wherein the upper support member, the lower support member and the central support member are arranged on the same plane, and wherein a distance between a joining portion of the central joining member with the backboard and a joining portion of the central joining member with the central support member is set to be larger than a distance between a joining portion of the upper joining member with the backboard and a joining portion of the upper joining member with the upper support member and a distance between a joining portion the lower joining member with the backboard and a joining portion of the lower joining member with the lower support member.

As described above, a distance between a joining portion of the central joining member with the backboard and a joining portion of the central joining member with a central support member is larger than that of the other joining members (for example, the central joining member is formed larger than other joining members), and as a result, the backboard protruding in a convex shape can be constructed on the rear surface of the seat back by merely attaching a plate-type material to each support member through joining members. Since the backboard is supported at three points by an upper support member, a lower support member and a central support member through respective joining members, strength of the backboard as a loading platform is further improved.

(5) According to a fifth aspect, there is provided the vehicle seat according to the first aspect, wherein the vehicle seat includes a plurality of seats, each seat including the backboard which is attached to the seat frame to have a convex state in which the center part of the surface thereof protrudes, and wherein the plurality of seats are provided side by side in a width direction.

(6) According to a sixth aspect, there is provided a vehicle seat including: a seat back including, a seat frame, and a seat body which is supported by the seat frame; and a backboard provided on a rear surface of the seat back, wherein the backboard is attached to the seat frame to have a convex state in which a center part of a surface thereof protrudes.

(7) According to a seventh aspect, there is provided the vehicle seat according to the sixth aspect, further including a cloth member covering a surface of the backboard, wherein the cloth member is at least in contact with the center part of the backboard.

What is claimed is:

1. A vehicle seat comprising:
   a seat back in which a seat body is supported by a seat frame;
   a backboard provided on a rear surface of the seat back; and
   a cloth member covering a surface of the backboard,
   wherein the seat frame includes:
      an upper support member extending in a width direction and is joined with an upper part of the backboard;
      a lower support member extending in the width direction and is joined with a lower part of the backboard; and
      a central support member joined with the center part of the backboard in the vertical direction of the backboard, and
   wherein a joining portion of the central support member with the backboard protrudes more rearward than a plane defined by the upper support member and the lower support member,
   wherein the backboard is attached to the seat frame in a convex shape in which a center part of a surface thereof protrudes to a rearmost-side, and
   wherein when the backboard is in a horizontal state, the backboard is attached to the seat frame in a convex state in which the center part of the backboard protrudes in a vertical direction.

2. A vehicle seat comprising:
   a seat back in which a seat body is supported by a seat frame;
   a backboard provided on a rear surface of the seat back; and
   a cloth member covering a surface of the backboard,
   wherein the seat frame includes:
      an upper support member extending in a width direction and is joined with an upper part of the backboard through an upper joining member;
      a lower support member extending in the width direction and is joined with a lower part of the backboard through a lower joining member; and
      a central support member extending in the width direction and is joined with the center part of the backboard in the vertical direction of the backboard through a central joining member,
   wherein the upper support member, the lower support member and the central support member are arranged on the same plane, and
   wherein a distance between a joining portion of the central joining member with the backboard and a joining portion of the central joining member with the central support member is set to be larger than a distance between a joining portion of the upper joining member with the backboard and a joining portion of the upper joining member with the upper support member and a distance between a joining portion the lower joining member with the backboard and a joining portion of the lower joining member with the lower support member.

3. The vehicle seat according to claim 1,
   wherein the vehicle seat includes a plurality of seats, each seat including the backboard which is attached to the seat frame to have a convex state in which the center part of the surface thereof protrudes, and
   wherein the plurality of seats are provided side by side in a width direction.

4. A vehicle seat comprising:
   a seat back including:
      a seat frame, and
      a seat body which is supported by the seat frame; and
   a backboard provided on a rear surface of the seat back,
   wherein the seat frame includes:
      an upper support member extending in a width direction and is joined with an upper part of the backboard;
      a lower support member extending in the width direction and is joined with a lower part of the backboard; and
      a central support member joined with the center part of the backboard in the vertical direction of the backboard, and
   wherein a joining portion of the central support member with the backboard protrudes more rearward than a plane defined by the upper support member and the lower support member,
   wherein the backboard is attached to the seat frame in a convex state in which a center part of a surface thereof protrudes, and
   wherein when the backboard is in a horizontal state, the backboard is maintained in the convex state in which the center part of the surface thereof protrudes in a vertical direction.

5. The vehicle seat according to claim 4, further comprising a cloth member covering a surface of the backboard,
   wherein the cloth member is at least in contact with the center part of the backboard.

* * * * *